Feb. 14, 1967       P. R. PERINO       3,303,702
PRESSURE TRANSDUCERS
Filed June 7, 1965       2 Sheets-Sheet 2

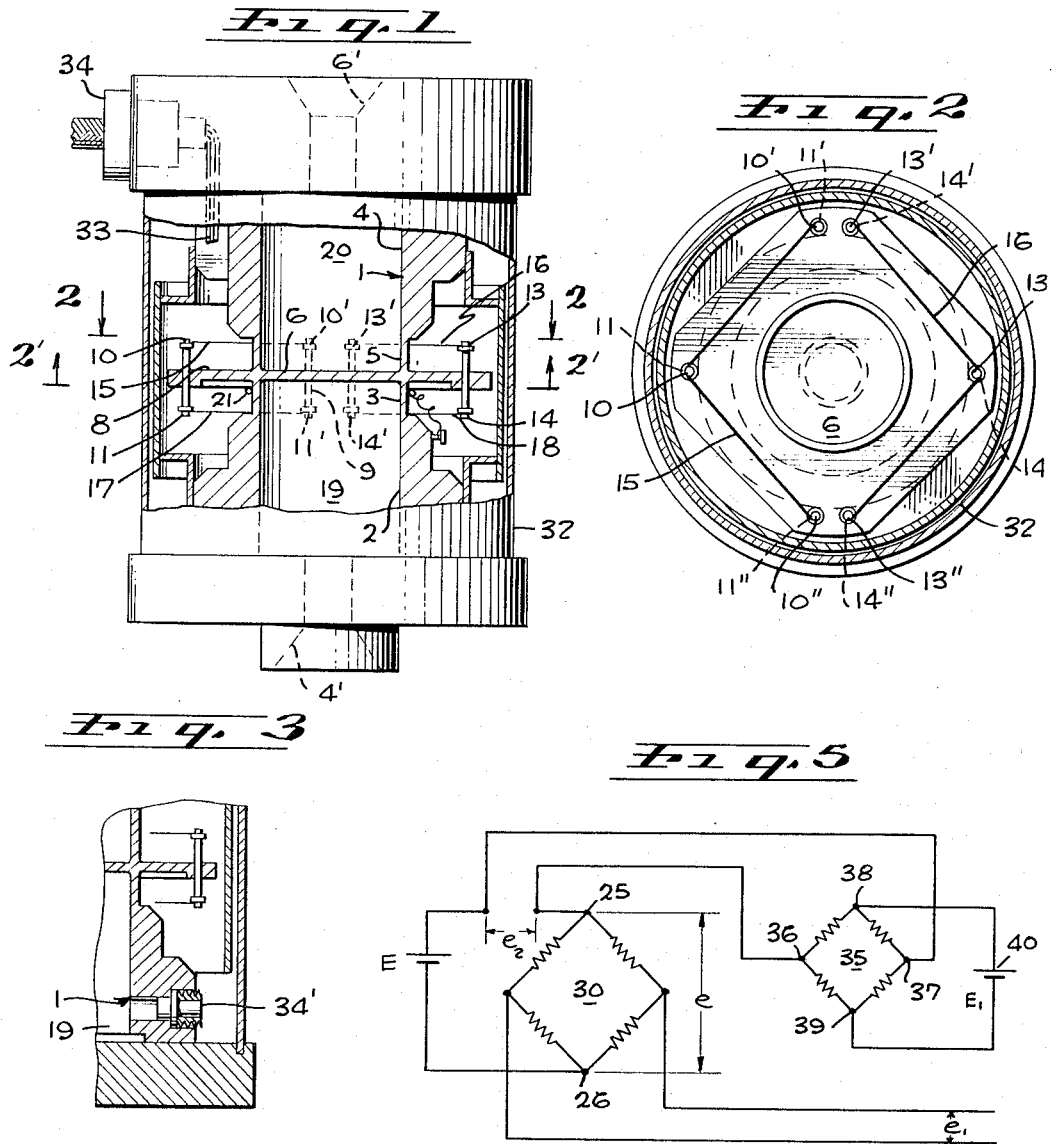

PETER R. PERINO
INVENTOR.

BY *Philip Subkow*
ATTORNEY

3,303,702
PRESSURE TRANSDUCERS

Peter R. Perino, Northridge, Calif., assignor to Statham Instruments, Inc., Los Angeles, Calif., a corporation of California
Filed June 7, 1965, Ser. No. 461,929
18 Claims. (Cl. 73—398)

This application is a continuation-in-part of application Serial No. 267,169 filed March 22, 1963.

This invention relates to differential transducers which sense the difference between two conditions to be sensed and has for its object to compensate for the sensitivity shift in the output of such transducer arising from the effect of one of said condition, for example, line pressures thereon, where the response of the transducer may be affected not only by the difference between the two conditions, but also by the magnitude of one or the other of the said conditions. An example of such a transducer is a differential pressure gage.

Such transducers are subject to an inaccuracy arising from the variation in sensitivity with changes in the magnitude of the conditions e.g. line pressure for like difference in the conditions, e.g. for like differential pressures. Sensitivity is defined as the ratio of the signal level to the magnitude of the differential pressure. It is desirable that the ratio be substantially constant within the specified design limits for all magnitudes of line pressure, over the range of differential pressure of interest, and line pressures of interest.

In such transducers where the pressures are exerted on a diaphragm or other force responsive element whose deflection is translated into a signal, the deflection may not be a linear function of the differential pressure. It is desirable that such proportionality be substantially constant. In such case, the transducer is said to be linear. This is a desirable objective. In such case, the equations state this objective:

$$F_1 - F_2 = KX$$

where $F_1 - F_2$ is the force resulting from the differential pressure and X is the deflection which is translated into the signal and K is the transfer function which relates the deflection to the differential force. Thus:

$$P_1 A_1 - P_2 A_2 = KX \quad \text{(Equation 1)}$$

where $P_1$ is the higher upstream pressure and $A_1$ is the effective area of the diaphragm on which the pressure $P_1$ is exerted, and $P_2$ is the downstream pressure, $A_2$ is the effective area of the diaphragm against which the lower downstream pressure $P_2$ is exerted, and where X is the deflection of the diaphragm to which the signal magnitude is proportional. K, the transfer function, is related to the stiffness of the system. It is desirable that transfer function K be as constant as possible over the range of pressures of $P_1$ and $P_2$ which the gage is to report, i.e. the so-called scale value F. In many such transducers, the value of the transfer function K varies with the load, i.e. the value of $P_1$ or $P_2$. This results in a change in the value of X as a function of $P_1$ or $P_2$ for any given value of $P_1 - P_2$, even though $A_1 = A_2$.

The transfer function K may increase or decrease either linearly or non-linearly as a function of $P_1$ or $P_2$. This variation may be considered as a variation in the stiffness of the system and may arise from a number of causes. Thus, even though the transducer is compensated for zero shift error, as in my previous application, the magnitude of the signal response to pressure difference will depend not only on the magnitude of the pressure difference, but also on the magnitude of the line pressure, i.e. $P_1$ or $P_2$. In the differential gage displacement X of the diaphragm system, which the transducer is responsive is given:

$$P_1 A_1 - P_2 A_2 = \Delta P = KX = (k_1 + k_2 P) X \quad \text{(Equation 2)}$$

where P may be either $P_1$ or $P_2$ and the bracketed portion, i.e. the transfer function is composed of two parts: a constant value $k_1$ and a value $k_2 P$ which depends upon the value of P. When employing transducer readouts responsive to the deflection X, such as for example, a bridge or a potentiometer, the deflection X results in a signal $e_1$ which is proportional both to the deflection and to the readout excitation voltage. If P and X are measured from a zero pressure base, $$e_1 = K_1 X e$$

and from Equation 2:

$$e_1 = \frac{K_1 \Delta P e}{(k_1 + k_2 P)} \quad \text{(Equation 3)}$$

when $k_2 P = 0$ the voltage $e_1$ is:

$$e_1 = \frac{K_1 \Delta P e}{k_1} \quad (3a)$$

where $e_1$ is the signal voltage and $e$ is the input voltage to the bridge and $K_1$ is the transfer function for the transducer. When $k_2 P$ is zero, the signal voltage depends only on $\Delta P$, since $K_1$ and $k$ are constant depending on the system and the input voltage $e$ may be held constant.

The variation in the value of $K_1 e$, arising from the finite value of $k_2$ may come from various causes in different forms of pressure gages where the stiffness of the system varies with variation in line pressure. I have found, in the usual case, that the deflection of the diaphragm results in a signal which is a diminishing ratio to the differential pressure, i.e. as the magnitude of the line pressure increases, i.e. $k_2$ is a negative value.

Two procedures may be followed for compensation depending whether the readout system is a bridge or potentiometer employing constant voltage excitation, or a constant current excitation. In the former case, I may add or subtract from the input or the output voltage the required value of the compensating voltage. In the case of both the potentiometer readout and the bridge readout with a constant voltage excitation, the compensating voltage may be either a voltage from a second voltage source resulting from the varying resistance of a variable resistor responsive to line pressure, or the output of a bridge which is responsive to line pressure. The variable resistor may be inserted in series with one or more of the active arms of a bridge.

Where the excitation is a constant current excitation, the compensating voltage is made to produce the compensation current which adds or subtracts from the excitation source current in such a manner to modify the resultant output voltage algebraically. This is accomplished by adding algebraically a current to the excitation source such as to add a compensation voltage $e_2$ to the output voltage, or subtract the voltage $e_2$ from the output voltage.

In order to make $e_1$ insensitive to the line pressure P and produce a signal level equal to that which would be produced if $k_2$ were zero, i.e. when the displacement is insensitive to line pressure, as stated above, I may add algebraically to the input voltage $e$, a voltage $e_2$ such that:

$$e_1 = \frac{K_1 \Delta P (e + e_2)}{(k_1 + k_2 P)} \quad \text{(Equation 4)}$$

or I may add to the output voltage $e_1$ a voltage such that:

$$e_1 = \frac{K_1 \Delta P e_2}{(k_1 + k_2 P)} = \frac{K_1 \Delta P e}{(k_1 + k_2 P)} \quad \text{(Equation 4a)}$$

It will be seen that Equations 4 and 4a are the same.

In order that $e_1$ shall be equal to the value $e_1$ where $k_2$ is zero, i.e. that the transducer be insensitive to line pressure and sensitive only to the differential pressure, the following relationship must exist:

$$e_1 = \frac{K_1 \Delta P}{(k_1 + k_2 P)}(e + e_2) = \frac{K_1 \Delta P e}{k_1} \quad \text{(Equation 5)}$$

from which it will appear that Equation 5 is satisfied if:

$$e_2 = e\left(\frac{k_2}{k_1}\right) P \quad \text{(Equation 6)}$$

It is to be noted that $e_2$ may be positive or negative depending on whether the error is positive or negative. It is added algebraically either to $e$ or $e_1$. Since the error in the output voltage $e_1$ is the difference between the value of $e_1$ as given by Equation 3 and 3a, this error voltage is proportional to the value of $e_2$.

It is an object of my invention to compensate for the above variation in the transfer function which relates the differential pressure to the signal level, in order to remove the error voltage introduced into the output voltage as a result of the sensitivity of the transducer to line pressure.

It is thus an object of my invention to introduce into an electrical readout circuit of a differential pressure transducer, whose voltage output is responsive to a differential pressure, and also to line pressure, an electrical function responsive to the magnitude of but one only of the pressures affecting the transducers, so as to modify the output voltage in an amount equal to the error voltage resulting from the influence of one of the pressures on the magnitude of the differential pressure signal.

It is a further object of my invention to apply this electrical function to cause a compensation in the output voltage.

It is a further object of my invention to apply a compensating voltage drop to algebraically add to the output voltage of the transducer.

As a further object of my invention to apply a compensating voltage drop to algebraically add to the excitation voltage of the transducer, the readout is a constant voltage source.

It is a further object of my invention to apply the electrical function as a compensating current to the excitation current when the excitation source of the readout is a constant current source.

A resistive bridge as well as the resistive potentiometer may be considered as a voltage divider, the legs of which may be varied in resistance with respect to each other so that the potential at the juncture of the resistances is a measure of the variation in this ratio.

The object of my invention is to affect the output of the bridge or potentiometer, for example, the potential at the juncture of the voltage divider in a manner to compensate for the effect of line pressure on the variation of the transfer function resulting from the variable portion of the transfer function.

In my preferred embodiment, I employ a transducer in which the readout is a Wheatstone bridge circuit whose output is made responsive to changes in the differential pressure of the pressure transducer. Instead of using a Wheatstone bridge readout, I may use a potentiometer readout such as has been employed in pressure transducers. I may compensate for this sensitivity error arising from the line pressure by introducing in series with the output voltage of the bridge, a voltage drop whose value is a function of the line pressure, and which will add or subtract the error voltage from the output voltage depending on the sign of the output voltage. I may also accomplish this result by algebraically adding the compensating voltage by introducing the compensating voltage in series or in parallel with one or both of the input corners of the potentiometer or bridge. The compensating voltage drop may be a second voltage source made responsive to line pressure, or may be a variable resistance in series with the input or output. I may introduce the resistor across the output corners of the bridge, or the output of potentiometer when the output impedance is high or in series with the bridge or potentiometer if the output impedance is low. The variable resistor may also be introduced in series with both adjacent arms of the bridge or potentiometer. The resistance of the variable resistor may be made responsive to line pressure.

For purposes of illustration only, not as a limitation of my invention, the following is a form of pressure transducer which I presently view to be a preferred form of my invention, without meaning to imply that other types of differential pressure gages would not as successfully employ my compensating transducers.

FIG. 1 is a cross-sectional view partly in elevation of one form of the differential pressure gage;

FIG. 2 is a section taken on line 2—2 of FIG. 1;

FIG. 3 is a modification of the system of FIG. 1;

FIG. 4 through FIG. 9 are schematic wiring diagrams of the electrical readout circuits which may be used with my invention.

FIG. 1 illustrates a form of differential pressure gage more fully described in the Di Giovanni Patent 2,958,056, to which reference may be had for further description.

Figure 6:
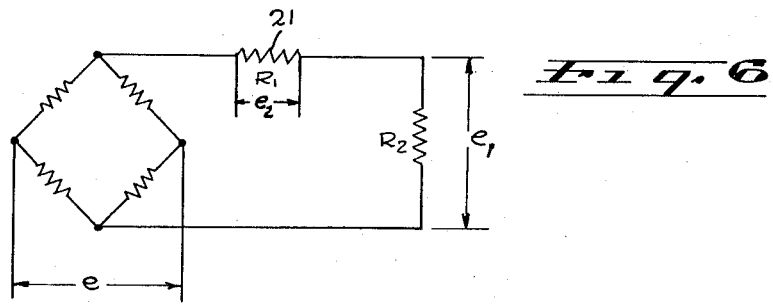

The tubular member 1 is formed of rigid portions 2 and 4 and thin-walled, reduced circumambient flexure sections 3 and 5. The diaphragm 6 is integrally formed with, or is welded to the reduced sections 3 and 5, which form a flexible, circumambient wall and the diaphragm extends across the interior of the tubular member between the chambers 19 and 20, and projects outwardly exteriorly of the tubular member, to produce overhanging section 8. Pressure is applied to chamber 19 through inlet 4', and to chamber 20 through inlet 6'. The insulating sapphire pins 9 are positioned in the overhanging portion 8, to extend upwardly and downwardly from the diaphragm section 6 equal distances.

The pins 9 are capped with metallic caps 10, 10' and 10" at the upper end of pins 9 and 11, 11' and 11" in the lower ends of the pins, and caps 13, 13' and 13" are connected to the upper ends and 14, 14' and 14" to the lower ends of the pins. Caps 14" and 11" do not appear in the drawings FIG. 1, but are positioned on the other ends of the pins on which caps 10" and 13" are positioned.

FIG. 2 illustrates the configuration viewed through a section on line 2—2. The configuration, when viewed along the section on line 2'—2', is identical. Electrical resistance strain wires are electrically and mechanically connected to the caps, thus wire 15 is connected to pin 10' and stretched in tension and connected to cap 10, and from cap 10 is stretched in tension and connected to 10". In like manner, the wire 16 is stretched between 13' and 13", and the wire 17 is stretched from the pins 11', 11 and 11". In like manner, the wire 18 is stretched from cap 14' to cap 14 to cap 14".

The external wall of the flexure carries similar electrical resistance strain wire 21. It is carried on this flexible, circumambient flexure 3 by the conventional bonded strain wire techniques used in cementing the electrical resistance strain wire to members which are to undergo deflection. Any of these techniques may be used, for example, circumambient wall 3 may be covered with an epoxy resin and thus insulated from the wire 21, and the wire 21 is bonded to the circumambient wall 3 by means of this epoxy resin. An insulating paper may be positioned between the wall 3 and the wire and all glued to the wall in a manner similar to that employed in the bonded strain wire gages.

The wires 15, 16, 17 and 18 and the wire 21, and a resistance wire 24, which is not subjected to stress variation or changes in resistance, are mounted within the case 32 of the device, and are connected as described below, to conduits shown at 33 to the terminal 34. The bridge 30 is assumed balanced when both ΔP is zero and $P_1$ is ambient pressure.

FIG. 3 shows a variation of the structure of FIG. 1. In that case, the wire 21 is not used. In place thereof a transducer 34' is positioned in the wall 1 and subjected to the pressure in chamber 19. Any conventional strain gage transducer may be employed. This transducer is a pressure gage and not a differential pressure gage, and any one of the pressure gages described in the above-mentioned patent may be employed.

Other examples are the gages described in Patents 2,622,176, 2,751,476 and 2,760,037.

In such transducers employing four resistances, all equal and equally stressed by the imposed pressure, two of the wires increase in tension and resistance, while two of the wires are reduced in tension and resistance. Where a resistance which increases with pressure is desired, I employ in series only the wires whose tension is increased and where I desire a resistance whose value decreases with tension, I employ in series only the wires whose tension is decreased with pressure.

Referring now to the form of transducer shown in FIGS. 1 and 2, the bridge and the resistor 21 may be connected as shown in FIG. 4.

When pressure is applied to inlet 4' and inlet 6', so that $P_1$ is exerted at 4', and the lower pressure $P_2$ is exerted through 6', the higher pressure in chamber 19 will cause the structure to deflect so that the diaphragm 6 is bowed outwardly toward the chamber 20, and the overhanging portion of the diaphragm will deflect downwardly toward the chamber 19, thus rotating the pins 9 so that the wires 15 and 16 are increased in tension, while the wires 17 and 18 are decreased in tension. At the same time, the wire 21 is also subjected to an increase in tension due to the deflection of the thin-walled flexure 3, as a result of the pressure in chamber 19.

The bridge 30 is excited by a constant voltage source E. The resistor 21 is in series with the input corner 25 of the bridge. The output voltage $e_1$ is across the corners 27 and 28. The voltage drop $e_0$ is the voltage drop across the resistor 21 when $P_1$, the pressure in 19 is zero. The voltage across the brige $e_1$ equals $E-e_0$. If no pressure is exerted equally on either side so that ΔP is zero and P is zero, or some fixed pressure datum, as for example, a calibrated atmospheric pressure, the resistance $R_{21}$ of 21 is such as to give a voltage drop $e_0$. If P changes, the resistance of 21 becomes $R_{21}+\Delta R_{21}$. The voltage $e$ at the input corners of the bridge is:

$$e=E-(e_0+\Delta e_0)$$
$$\Delta e_0=e_2=k_3P \quad \text{(Equation 7)}$$

where $\Delta e_0$ is the voltage drop due to the change in resistance of 21, due to the pressure P.

From Equation 6:

$$k_3=e\frac{k_2}{k_1} \quad \text{(Equation 8)}$$

The relationship of Equation 8 can be established by adjusting the value of $k_1$ and $k_2$. Both are measurable since the value of the uncompensated voltage of the transducer, as a function of line pressure at constant differential pressure may be plotted. The value of the output at zero value of P can be computed. From such a calibration, the values of $k_1$ and $k_2$ may be determined. It will be noted that E may be adjusted at will and $e_0$ may be arbitrarily determined by adjusting the value of the resistor 21. The value of $k_3$ may be adjusted by adjusting the stiffness of the transducer which affects the transfer function $k_3$ of Equation 7. This is more easily accomplished where the transducer is associated with the resistor 21, as an independent transducer shown in FIG. 3.

FIG. 5 shows a variation of the circuit of FIG. 4, in which the transducer, responsive to the line pressure, employs a bridge readout. Such a transducer may be 34' of FIG. 3. The output of the transducer is a voltage $e_2$ (see Equations 4 to 6).

This voltage may be either the voltage drop across the variable resistor such as 21, as described above or the output of the bridge 35. The compensating voltage $e_2$ is the output of the bridge 35 energized by 40, at the input corners 38 and 39 by a constant voltage source $E_1$. The output at 36 and 37 is a potential drop $e_2$ which is in series with a constant voltage source E. The voltage across 25 and 26 is $e$. The output of the bridge 30 for any pressure P in 19, measured above zero pressure in 19, is given as follows:

$$e_2=\frac{\Delta R_1}{R_1}E_1$$

where $R_1$ is the bridge resistance 35 and $E_1$ is the excitation voltage 40, and $\Delta R_1$ is the change of resistance of the equal arms of the bridge $\Delta R_1=k_4P$.

From Equation 6 for compensation:

$$e_2=e\left(\frac{k_2}{k_1}\right)P$$

$$k_4P=e\left(\frac{R_1}{E_1}\right)\left(\frac{k_2}{k_1}\right)P \text{ and}$$

$$k_4=\frac{R_1e}{E_1}\left(\frac{k_2}{k_1}\right) \quad \text{(Equation 9)}$$

The observations made with respect to the adjustment transducer in the circuit of FIG. 4, applies as well here.

Instead of modifying the energizing voltage of the input corners of the bridge, I may place the resistor in series with the output of the bridge of the differential pressure transducer, as shown in FIG. 6. The resistor 21 is in series with the load on the bridge, whose resistance is $R_2$ and $e_2=R_1i_2$.

$$e_1=\frac{K_1\Delta Pe}{k_1+k_2P} \quad \text{(from Equation 4)}$$

For compensation (see Equation 5):

$$e_1=\frac{K_1\Delta Pe}{k_1}$$

when $P_1$ is finite to give ΔP $R_1$ becomes $R_1+\Delta R$ since $$\Delta R_1=k_3P$$

The current through the resistor 21 and the load $R_2$ is given by:

$$i_2=\frac{e_1}{R+R_1+\Delta R_1+R_2}=\frac{K_1\Delta Pe}{(k_1+k_2P)(R+R_1+\Delta R_1+R_2)}$$

For compensation $$i_2=\frac{K_1\Delta Pe}{k_1(R+R_1+\Delta R+R_2)}=\frac{K_1\Delta Pe}{(k_1+k_2P)(R+R_1+\Delta R_1+R_2)}$$

and $$k_1\Delta R_1=k_2P(R+R_1+\Delta R_1+R_2)$$

$$k_3=\frac{k_2(R+R_1+R_2)}{k_1-k_2P}$$

For small differences in $e_1$ as a result of small values of $k_2$ in $$k_2P_1\ll k_1$$

$$k_3\approx\frac{k_2}{k_1}(R+R_1+R_2) \quad \text{(Equation 10)}$$

Figure 7:
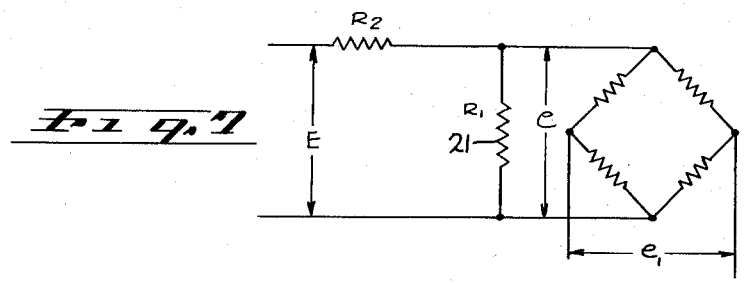

In the form of FIG. 7, the resistor 21 is placed across the input to the bridge and the resistor $R_2$ is placed in series with the input. R is the bridge resistance.

The bridge excitation voltage $e$ depends on the value of the resistance $R_1$.

We may write:

$$e=EA$$

where $$A = \frac{RR_1}{R_2R + R_1(R+R_2)}$$

when the pressure P is zero. When the pressure P is finite $R_1$ is $R_1 + \Delta R_1$ and A becomes $A + \Delta A$ and $A = k_4 P$ as previously $$e_1 = \frac{k_1 \Delta P E}{k_1 + k_2 P}(A + \Delta A)$$

and for compensation $$e_1 = \left(\frac{k_1 \Delta P E}{k_1}\right) A = \left(\frac{k_1 \Delta P E}{k_1 + k_2 P}\right)(A + \Delta A)$$

$$\frac{A}{k_1} = \frac{A + \Delta A}{k_1 + k_2 P} \qquad \text{(Equation 11)}$$

$$\Delta A = \left(\frac{k_1 + k_2 P}{k_1}\right) A - A = A\left(\frac{k_2 P}{k_1}\right)$$

$$k_4 = \left(\frac{k_2}{k_1}\right) A \qquad \text{(Equation 12)}$$

For small values of $k_2 P$ and $\Delta A$ $$\Delta A \approx \frac{\Delta R_1 R}{R_2 R + R_1(R+R_2)} \qquad \text{(Equation 13)}$$

Figure 8:
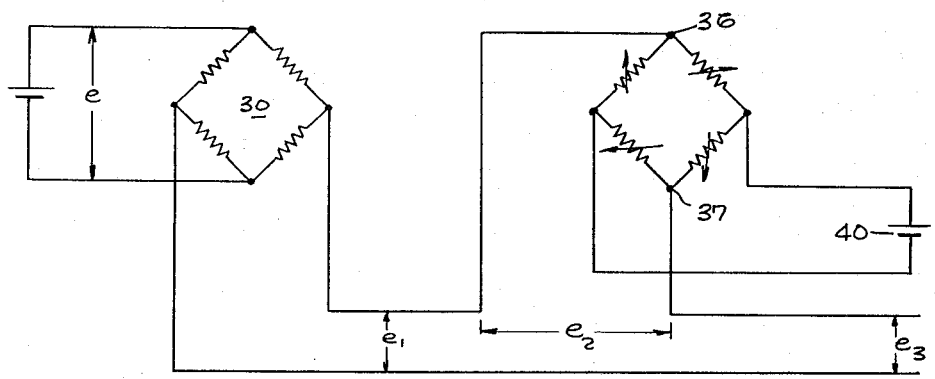

In FIG. 8, the output of the bridge is introduced as a compensating voltage to the output of the bridge 30. The output corners 36 and 37 are connected in series with the output of the bridge 30. The output of the bridge at 36 and 37 is the voltage $e_2$ which modifies the bridge 30 output at 27 and 28 to give the compensated voltage $e_3$.

As previously, from Equation 3a:

$$e_1 = \frac{K_1 \Delta P e}{k_1 + k_2 P}$$

$$e_3 = e_1 + e_2$$

$e_2 = k_5 P$ since the bridge output is proportional to P.

For compensation:

$$\frac{K_1 \Delta P e}{k_1} = \frac{K_1 \Delta P e}{k_1 + k_2 P} + e_2$$

$$e_2 = \frac{K_1 \Delta P e}{k_1} - \frac{K_1 \Delta P e}{k_1 + k_2 P} = \frac{K_1 \Delta P e}{k_1}\left[\frac{k_2 P}{k_1 + k_2 P}\right]$$

$$e_2 = k_5 P = \frac{K_1 \Delta P e}{k_1}\left[\frac{k_2 P}{k_1 + k_2 P}\right] = \left[\frac{K_1 \Delta P e}{k_1 + k_2 P}\right]\left[\frac{k_2 P}{k_1}\right]$$

$$\text{(Equation 14)}$$

From Equation 3:

$$k_5 P = \frac{k_2 P e_1}{k_1}$$

$$k_5 = \frac{k_2 e_1}{k_1} \qquad \text{(Equation 15)}$$

Figure 9:
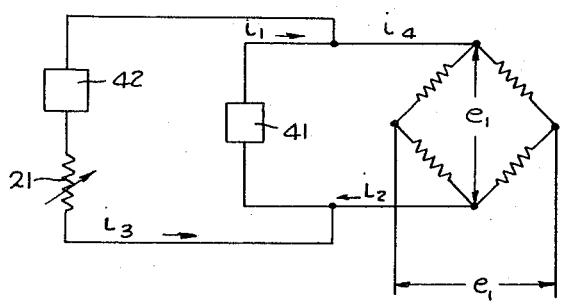

In FIG. 9, 41 is a constant current source which produces a constant current $i_1$, to energize the bridge 30 whose resistance is R. An auxiliary current source 42 in series with the variable resistor 21, is shunted across the input corners of the bridge 30 to establish a potential $e_2$ and circulate a current $i_3$ through the variable resistor 21, which produces a circulating current $i_2$ which adds algebraically to $i_1$ to pass a current $i_4$ to the bridge.

From the foregoing:

$$e_1 = \frac{K_1 \Delta P e}{k_1 + k_2 P} = \left(\frac{K_1 \Delta P}{k_1 + k_2 P}\right) i_4 R$$

where R is the bridge resistance.
For compensation as previously:

$$e_1 = \frac{K_1 \Delta P (i_4 R)}{k_1} = \frac{K_1 \Delta P [R(i_4 + i_2)]}{k_1 + k_2 P}$$

Solving:

$$i_2 = \frac{k_2}{k_1} P i_4$$

since $$i_2 = k_6 P$$

$$k_6 = \frac{k_2}{k_1} i_4 \text{ and}$$

$$i_4 = \frac{e}{R}$$

$$k_6 = \left(\frac{k_2}{k_1}\right)\left(\frac{e}{R}\right)$$

In the above analysis, it is assumed that $k_2$ is a constant for all values of P. If it is a variable, then instead of $k_2$ in the above analysis by the determined function of P, determined analytically or experimentally. As a practical matter, it is sufficient to consider $k_2$ constant since the error introduced by any variation of $k_2$ in a practical transducer may be considered a second order.

At the very least, such a consideration will reduce the error due to the variation in the transfer function of the transducer, and thus increase its accuracy of the differential pressure gage.

All of the above expressions containing equalities and proportionality constants between variable parameters, are to be taken as expressions of ideal conditions and are intended to include substantial equality and substantially constant values of the constants substantially independent of the value of the variables. Practical values of these constants and parameters are such that the value of $e_2$, the output of the variable impedance, shall not vary more than about ±1% of the maximum value of $e_2$ (called full scale value) which the differential transducer is to produce, substantially independent of the value of the condition P up to the maximum value of P for which the full scale value is obtained.

While I have illustrated my invention by reference to variable voltage dividers and resistances and resistive Wheatstone bridges, the compensating voltage $e_2$ and the uncompensated voltage $e_1$ may also be derived from impedance bridges and half bridges such as inductive readouts and capacitative readouts which have been used to report the deflection of flexures in transducers.

All of such devices are or contain variable impedances to which an energizing voltage is applied and the impedance thereof is varied by the application of the energizing potential to give an output potential responsive to the conditions to be sensed, for example, the pressures as above.

While I have described particular embodiments of my invention for the purpose of illustration, it should be understood that various modifications and adaptations thereof may be made within the spirit of the invention, as set forth in the appended claims.

I claim:

1. A differential transducer, a displaceable force responsive element responsive to the difference of two forces to be sensed by said transducer, variable impedance means, means to translate the deflection of said element to vary the impedance thereof, input connections and output connections to said impedance means, means to apply a voltage $e$ to the input connections and to develop a voltage $e_1$ at the output connections on deflection of said force responsive means upon application of said two forces one of which has a force value of P and the difference between said two forces having a value $\Delta P$, the output voltage $e_1$ being dependent on both $\Delta P$ and P, means for compensating for the effect of the value of P comprising means to algebraically add a compensating voltage to one of said voltages to obtain an output voltage $e_1$ substantially independent of the value of P and being substantially proportional to the product $\Delta P \times e$.

2. The differential transducer of claim 1, said force responsive element being a diaphragm in said transducer against which said forces are exerted, said forces being pressure exerted against said diaphragm on both sides of said diaphragm, said variable impedance being a variable voltage divider.

3. A differential pressure gage of claim 2, said means to algebraically add a compensating voltage comprising a second pressure transducer, a diaphragm in said second transducer, a variable resistance, means to exert one of the said pressures P exerted against the diaphragm of said differential transducer, against the diaphragm of said second transducer, the resistance of said variable resistance being responsive to the displacement of the diaphragm of said second transducer on application of said pressure P to said second transducer and to said differential transducer to develop a difference in pressure $\Delta P$ across the diaphragm of said differential transducer, means to apply a voltage $e$ to the input of said voltage divider and a voltage across the variable resistor, on application of said pressure P, such that on development of said pressure $\Delta P$, the change in voltage $e_2$ across variable resistor, upon application of said pressure P, is substantially equal to $k_3 P$ where $k_3$ is substantially equal to $$e\left(\frac{k_2}{k_1}\right)$$

$k_1$ and $k_2$ being substantially of constant value and substantially independent of the value of $\Delta P$ and P.

4. The differential pressure transducer of claim 3, in which the variable resistance is a Wheatstone bridge in which $\Delta e_0$ is the change in output of said last named variable voltage divider on application of the pressure P.

5. The differential pressure transducer of claim 1, in which said variable voltage divider connected to the diaphragm of said second pressure transducer is a Wheatstone bridge, input power connections and output connections for said Wheatstone bridge, said output connections in series and with the output of said variable voltage divider responsive to the displacement of the diaphragm of the differential pressure transducer, the arms of said bridge being all equal in resistance and all arms having an initial resistance $R_1$ when P is zero, and varying in an amount equal to $\Delta R_1$ upon application of the pressure P to said second transducer and where the voltage unbalance of said bridge is $e_2$ and is substantially equal to $$\left(\frac{\Delta R_1}{R_1}\right)E_1$$

where $E_1$ is the excitation voltage applied to the input connections to said bridge.

6. A differential pressure transducer, a diaphragm in said transducer subject to pressures on each side of said diaphragm, said diaphragm deflecting on application to said diaphragm of a difference in said pressures, means including a variable voltage divider, said voltage divider comprising a pair of variable resistors in series responsive to the deflection of said diaphragm, a pair of excitation power input connections to said voltage divider, and output connections to said voltage divider, a second pressure transducer, means in said second pressure transducer including a variable resistance in said transducer responsive to one only of said pressures, said resistance connected in series with one of said input connections.

7. The differential pressure transducer of claim 6, in which said voltage divider is a Wheatstone bridge.

8. A differential pressure transducer, a diaphragm in said transducer, means to apply pressures to both sides of said diaphragm, said diaphragm deflecting on application of a difference in pressure between said applied pressures, means including a variable voltage divider comprising a pair of variable resistors connected in series responsive to the deflection of said diaphragm, a pair of excitation power input connections to said voltage divider, output connections to said voltage divider, a second pressure transducer, a diaphragm in said second pressure transducer, means including a variable resistance responsive to the deflection of the last named diaphragm on application of one of said pressures to said last named diaphragm, said resistance connected in series with one of said output connections.

9. The differential pressure transducer of claim 8, said variable voltage divider responsive to the deflection of said diaphragm of said differential pressure gage is a Wheatstone bridge, power input and output connections to said Wheatstone bridge, said variable resistor connected to one of the output connections of said Wheatstone bridge, a load resistance connected to said variable resistor and to the other output connection of said bridge.

10. The differential pressure transducer of claim 9, in which $k_2/k_1$ $(R+R_1+R_2)$ is a substantially constant value independent of the value of P, where P is a pressure applied to one side of the diaphragm of said differential pressure transducer and to said second transducer and where R is the resistance of said bridge and $R_1$ is the resistance of said variable resistor when P is zero and $R_2$ is the load resistance $k_1$ and $k_2$ are of substantially constant value and are substantially independent of the value of the difference of the pressures applied to the differential pressure transducer.

11. A differential pressure transducer, a diaphragm in said transducer subject to pressures on each side of said diaphragm, said diaphragm deflecting on application of a difference in said pressures, means including a variable voltage divider comprising a pair of variable resistors in series responsive to the deflection of said diaphragm, a power input connection to said voltage divider, output connections to said voltage divider, a second pressure transducer, means including a variable resistance connected to said second pressure transducer responsive to one only of said pressures, said second named variable resistance connected in shunt across the power input connections of said voltage divider of said differential transducer.

12. The differential transducer of claim 11, in which said first mentioned variable voltage divider is a Wheatstone bridge and said variable resistance is shunted across the input corners of said bridge.

13. A differential pressure transducer, a diaphragm in said transducer subject to pressures on each side of said diaphragm, said diaphragm deflecting on application of a difference in said pressures, means including a variable voltage divider comprising a pair of variable resistors in series responsive to the deflection of said diaphragm, excitation power input connection to said voltage divider and output connections to said voltage divider, a second pressure transducer, a diaphragm in said second pressure transducer, means including a variable voltage divider comprising a pair of variable resistances in series responsive to the deflection of said diaphragm in said second transducer upon application of one of said pressures in said second transducer, power input connectioins and output connections to said last named voltage divider, the output connections of said second voltage divider in series with the output connections to said first mentioned voltage divider.

14. The differential pressure transducer of claim 13, in which each of said voltage dividers is a Wheatstone bridge.

15. A differential pressure transducer, a diaphragm in said transducer, a pressure inlet to said transducer on each side of said diaphragm, said diaphragm deflecting on the application of a difference in pressure across said diaphragm, means including a variable voltage divider comprising a pair of variable resistors in series responsive to the deflection of said diaphragm, a pair of excitation power input connections to said voltage divider and output connections to said voltage divider, a second pressure transducer, a diaphragm in said transducer, a pressure inlet to said last-named transducer connected on one side of said last-named diaphragm and to one of said first-named pressure inlets, means including a variable resistance responsive to the deflection of said last-named diaphragm, a second pair of connections to the input connections to said variable voltage divider, said variable resistance in series with one of the said second connections.

16. The differential pressure tranducer of claim 15, a constant current source connected to the input to said variable voltage divider and to said variable resistor.

17. The differential pressure gage of claim 15, said variable voltage divider is a Wheatstone bridge.

18. The differential pressure transducer of claim 17, a constant current source connected to the input of said Wheatstone bridge and to said variable resistor.

References Cited by the Examiner

UNITED STATES PATENTS

| | | | |
|---|---|---|---|
| 2,767,974 | 10/1956 | Ballard et al. | 73—398 |
| 2,801,388 | 7/1959 | Ruce | 73—88.5 |
| 3,034,346 | 4/1962 | Starr | 73—141 |
| 3,228,240 | 1/1966 | Ormond | 73—88.5 X |
| 3,234,787 | 2/1966 | Ruge | 73—88.5 X |

LOUIS R. PRINCE, *Primary Examiner.*

DONALD O. WOODIEL, *Assistant Examiner.*